Patented July 7, 1936

2,046,548

UNITED STATES PATENT OFFICE 2,046,548

PROCESS FOR THE REMOVAL OF INSECTICIDAL RESIDUES FROM FRUITS AND VEGETABLES

Roscoe H. Carter and Jack E. Fahey, Washington, D. C.; dedicated to the free use of the Public of the United States of America No Drawing. Application May 23, 1934, Serial No. 727,142

3 Claims. (Cl. 99—103)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to us of any royalty thereon.

We hereby dedicate the invention herein described to the free use of the public in the territory of the United States of America to take effect upon the granting of a patent to us.

This invention relates to the use of certain combinations of chemicals to remove or dissolve certain insecticidal residues from deciduous fruits and from vegetables.

The agent used for the removal of the insecticidal residue is a mixture of a water solution of hydrochloric or sulphuric acid with boric acid. It has been found by experimentation that boric acid materially increases the solvent action of weak water solutions of hydrochloric or sulphuric acid on residues left after spraying or dusting with certain insecticidal materials.

The residues in question are such fluorine-containing deposits as remain on fruits and vegetables from the application of such materials as sodium fluoaluminate (cryolite, natural or synthetic) potassium fluoaluminate, barium fluosilicate, sodium fluosilicate, sodium fluoferrate, potassium fluoferrate, nicotine fluosilicate, etc. The deciduous fruits referred to are apples, pears, plums, prunes, peaches, apricots, quinces, nectarines, cherries, grapes, currents, gooseberries, raspberries, strawberries, blackberries, etc. The vegetables include beans, celery, greens such as spinach, chard, etc., peas, lettuce, tomatoes, etc.

The removal of the insecticidal residues is effected by washing the fruit or vegetables in a suitable washing apparatus with a water solution of a mixture of hydrochloric or sulphuric acid with boric acid used at such concentrations as will be effective. For most purposes the concentration of the acid should be from 0.1 to 2.5 percent hydrochloric acid (HCl) or sulphuric acid ($H_2SO_4$) and the boric acid from 1.0 percent ($H_3BO_3$) to excess of the amount required for a saturated solution.

The concentrations of solvents and length of time required for the removal of the residues are dependent on the temperature of the solution, the amount of agitation and type of washing machine, the amount and nature of the residue present and the amount of wax or oil that may be on the fruit at the time of washing. The higher the temperature of the cleaning solution the shorter the time required to remove the residues from the fruit and vegetables, such temperature of course, not being sufficiently high as to injure the fruit or vegetables. After treatment in this cleaning solution the fruit or vegetables are rinsed by washing with water to remove the cleaning solution.

Having fully disclosed our invention, we claim:

1. A process for the removal of insecticidal fluorine residues from fruits and vegetables comprising the application to the fruit or vegetables of aqueous solutions of mixtures of boric acid with hydrochloric acid, followed by washing with water to remove said solutions.

2. A process for the removal of insecticidal fluorine residues from fruits and vegetables comprising the application to the fruits and vegetables of aqueous solutions of mixtures of boric acid with sulfuric acid followed by washing with water to remove said solutions.

3. A process for the removal of insecticidal fluorine residues from fruits and vegetables comprising the application to the fruits and vegetables of aqueous solutions of mixtures of boric acid with a mineral acid selected from the group consisting of hydrochloric acid and sulfuric acid, followed by washing with water to remove the said solutions.

ROSCOE H. CARTER.
JACK E. FAHEY.